US008989118B2

(12) United States Patent
He et al.

(10) Patent No.: US 8,989,118 B2
(45) Date of Patent: Mar. 24, 2015

(54) UPLINK CONTROL CHANNEL RESOURCE MAPPING FOR AN ENHANCED PDCCH IN LTE SYSTEMS

(71) Applicant: Intel Corporation, Santa Clara, CA (US)

(72) Inventors: Hong He, Beijing (CN); Jong-Kae Fwu, Sunnyvale, CA (US); Yuan Zhu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 45 days.

(21) Appl. No.: 13/629,546

(22) Filed: Sep. 27, 2012

(65) Prior Publication Data

US 2013/0242817 A1    Sep. 19, 2013

Related U.S. Application Data

(60) Provisional application No. 61/612,188, filed on Mar. 16, 2012.

(51) Int. Cl.
*H04W 4/00* (2009.01)
*H04W 72/04* (2009.01)
*H04L 1/18* (2006.01)

(52) U.S. Cl.
CPC ......... *H04W 72/0413* (2013.01); *H04L 1/1896* (2013.01)
USPC ....................................................... 370/329

(58) Field of Classification Search
None
See application file for complete search history.

(56) References Cited

U.S. PATENT DOCUMENTS

2010/0208629 A1    8/2010  Ahn et al.
2012/0042221 A1    2/2012  Kim et al.
2012/0320846 A1*  12/2012 Papasakellariou et al. ... 370/329
2013/0064196 A1*   3/2013  Gao et al. ...................... 370/329
2013/0114530 A1*   5/2013  Chen et al. ..................... 370/329
2013/0230017 A1*   9/2013  Papasakellariou et al. ... 370/330
2013/0230029 A1*   9/2013  Papasakellariou et al. ... 370/336
2013/0230030 A1*   9/2013  Papasakellariou et al. ... 370/336

FOREIGN PATENT DOCUMENTS

KR    1020090107559 A    10/2009
KR    1020110068839 A    6/2011
WO    WO-2013138047 A1   9/2013

OTHER PUBLICATIONS

"Evolved Universal Terrestrial Radio Access (E-UTRA); Physical Channels and Modulation", 3GPP TS 36.211 V10.4.0. Technical Specification Group Radio Access Network. Release 10., (Dec. 22, 2011), 101 pgs.
"International Application Serial No. PCT/US2013/027332, International Search Report mailed Jul. 14, 2013", 5 pgs.
"International Application Serial No. PCT/US2013/027332, Written Opinion mailed Jun. 14, 2013", 4 pgs.
"PUCCH resource allocation for E-PDCCH", 3GPP TSG RAN1 #68. R1-120329. Pantech., (Feb. 6, 2012), 2 pgs.

* cited by examiner

*Primary Examiner* — Otis L Thompson, Jr.
(74) *Attorney, Agent, or Firm* — Schwegman Lundberg & Woessner, P.A.

(57) ABSTRACT

An enhanced physical down link control channel (ePDCCH) for Long Term Evolution (LTE) systems is described that is constructed using enhanced control channel elements (eC-CEs). Techniques are also described by which user equipment (UE) may be implicitly allocated uplink resources for transmitting acknowledgements to data received via downlink resources allocated by an ePDCCH.

22 Claims, 7 Drawing Sheets

UPLINK CONTROL CHANNEL RESOURCE MAPPING FOR AN ENHANCED PDCCH IN LTE SYSTEMS

PRIORITY CLAIM

This application claims the benefit of priority under 35 U.S.C. 119(e) to U.S. Provisional Patent Application Ser. No. 61/612,188, filed on Mar. 16, 2012, which is incorporated herein by reference in its entirety.

BACKGROUND

A major feature of LTE-Advanced (Long Term Evolution-Advanced or LTE-A), as part of Release 10 of the LTE specification by the 3rd Generation Partnership Project (3GPP), is increased support for multi-user MIMO (multi-input multi-output) in which spatial multiplexing is used to provide separate downlink and uplink communications paths between a base station (referred in LTE systems as an evolved Node B or eNB) and multiple terminals (where a terminal is referred to in LTE systems as user equipment or UE). As more UEs are scheduled per subframe for multi-user MIMO operations, the demand for physical downlink control channel (PDCCH) resources to provide scheduling for physical uplink control channel (PUCCH) resources is increased. The design of the PDCCH in Releases 8/9/10 of the LTE specification provides for a maximum PDCCH size of three OFDM (orthogonal frequency division multiplexing) symbols which is inadequate for meeting this increased demand. Consequently, a new PDCCH design, referred to an enhanced PDCCH (ePDCCH), was introduced in the PDSCH (physical downlink shared channel) region for Release 11 of the LTE specification. The structure of the PDCCH is based upon so-called control channel elements (CCEs), while the ePDCCH uses a design based upon physical resource blocks (PRBs) in order to increase capacity and enhance support for inter-cell interference coordination (ICIC) in heterogeneous network scenarios. The limitation of the Release 8/9/10 PDCCH design for performing inter-cell interference coordination (ICIC) stems from the fact that, due to PDCCH interleaving, the CCEs used for the transmission of downlink control information (DCI) formats in the PDCCH are distributed over the entire bandwidth in an irregular fashion. Placing the ePDCCH in the PDSCH region with a PRB-based scheme, on the other hand, allows the ePDCCH to be distributed over the bandwidth so as to better support frequency-domain ICIC.

The use of the PRB-based ePDCCH, however, cannot be used in the same manner as the CCE-based PDCCH to dynamically allocate uplink resources for acknowledging downlink data transmissions. That is a concern of the present disclosure.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

LTE uses a combination of forward error-correction coding and ARQ (automatic repeat request), referred to as hybrid ARQ. Hybrid ARQ uses forward error correction codes to correct some errors. When uncorrected errors are detected, the corrupted transmissions are discarded and the receiver requests retransmission. As the term is used herein, a hybrid-ARQ acknowledgement may either be a negative acknowledgement (NACK), signifying that a transmission error has occurred and that a retransmission is requested, or a positive acknowledgement (ACK) indicating that the transmission was received correctly.

When the eNB transmits data to a UE, the LTE requires allocation of uplink resources by the eNB in order to respond with a hybrid-ARQ acknowledgement. Described herein is an ePDCCH configuration and techniques by which such uplink resources may be dynamically allocated to the UE in cases where the allocation of the downlink resources is over an ePDCCH.

LTE Air Interface

Figure 1:
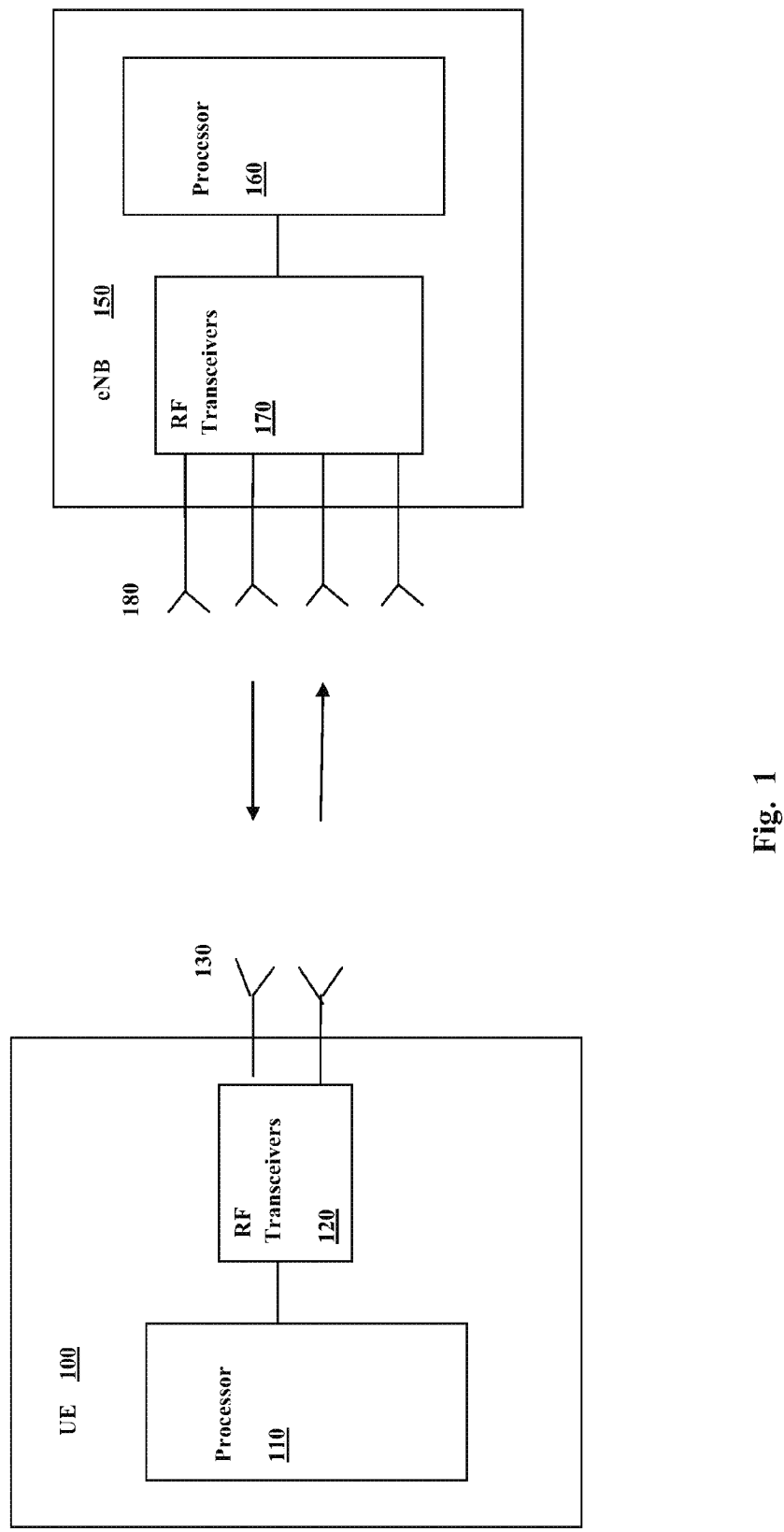
FIG. 1 illustrates a UE and an eNB in accordance with some embodiments.

FIG. 1 shows an example of a UE 100 and an eNB 150. The UE and eNB incorporate processing circuitries 110 and 160, respectively. The processing circuitry 110 in the UE is interfaced to a plurality of RF transceivers 120 that are each connected to one of a plurality of antennas 130. The processing circuitry 160 in the eNB is interfaced to a plurality of RF transceivers 170 that are each connected to one of a plurality of antennas 180. The illustrated components are intended to represent any type of hardware/software configuration for providing an LTE air interface and performing the processing functions as described herein.

The LTE air interface, also referred to as the radio access network (RAN), has a protocol architecture that may be basically described as follows. The topmost layer is the packet data compression protocol (PDCP) layer which transmits and receives IP (internet protocol) packets. The PDCP layer communicates with the RLC layer via radio bearers to which IP packets are mapped. At the medium access control (MAC) layer, the connection to the RLC layer above is through logical channels, and the connection to the physical layer below is through transport channels. The MAC layer handles multiplexing/demultiplexing between the logical channels, hybrid-ARQ operations, and scheduling, the latter being performed solely at the eNodeB for both the uplink and the downlink. Data in a transport channel is organized into transport blocks, with respect to which the hybrid-ARQ function is performed at both the UE and eNB. The primary transport channels used for the transmission of data, the uplink shared channel (UL-SCH) and downlink shared channel (DL-SCH), are mapped to the physical uplink shared channel (PUSCH) and physical downlink shared channel (PDSCH), respectively, at the physical layer.

The physical layer of LTE is based upon orthogonal frequency division multiplexing (OFDM) for the downlink and a related technique, single carrier frequency division multiplexing (SC-FDM), for the uplink. In OFDM/SC-FDM, complex modulation symbols according to a modulation scheme such as QAM (quadrature amplitude modulation) are each individually mapped to a particular OFDM/SC-FDM subcarrier transmitted during an OFDM/SC-FDM symbol, referred to as a resource element (RE). An RE is the smallest physical resource in LTE. LTE also provides for MIMO (multi-input multi-output) operation where multiple layers of data are transmitted and received by multiple antennas and where each of the complex modulation symbols is mapped into one of the multiple transmission layers and then mapped to a particular antenna port. Each RE is then uniquely identified by the antenna port, sub-carrier position, and OFDM symbol index within a radio frame as explained below.

LTE transmissions in the time domain are organized into radio frames, each having a duration of 10 ms. Each radio frame consists of 10 sub-frames, and each sub-frame consists of two consecutive 0.5 ms slots. Each slot comprises six indexed OFDM symbols for an extended cyclic prefix and seven indexed OFDM symbols for a normal cyclic prefix. A group of resource elements corresponding to twelve consecutive subcarriers within a single slot is referred to as a resource block (RB) or, with reference to the physical layer, a physical resource block (PRB).

In the case of FDD (frequency division duplex) operation, where separate carrier frequencies are provided for uplink and downlink transmission, the above-described frame structure is applicable to both the uplink and downlink without modification. In TDD (time division duplex) operation, subframes are allocated for either uplink or downlink transmission with a special subframe occurring at the transition from downlink to uplink transmission (but not at the transition from uplink to downlink transmission). The eNB manages the allocation of uplink and downlink subframes within each radio frame during TDD operation.

LTE Control Signaling

A physical channel corresponds to the set of time-frequency resources used for transmission of a particular transport channel, and each transport channel is mapped to a corresponding physical channel. There are also physical control channels without a corresponding transport channel that are needed for supporting the transmission of the downlink and uplink transport channels. These include the physical downlink control channel (PDCCH), by which the eNB transmits downlink control information (DCI) to the UE, and the physical uplink control channel (PUCCH) that carries uplink control information (UCI) from the UE to the eNB. Insofar as is relevant to the present disclosure, the DCI carried by the PDCCH may include scheduling information that allocates uplink and downlink resources to the UE, while the UCI carried by the PUCCH-may include hybrid-ARQ acknowledgements for responding to transport blocks received by the UE.

PDCCHs are transmitted in a designated control region of each subframe. The mapping of PDCCHs to resource elements is done with a particular structure based on control channel elements (CCEs), where a CCE is a set of thirty-six contiguous resource elements. The number of CCEs required for a certain PDCCH depends on the size of the DCI being carried.

Each PDCCH may be addressed to a specific UE by appending a UE-specific CRC (cyclic redundancy check) to the PDCCH, which also serves for error detection. Thus, a UE detects a PDCCH intended for it by performing the CRC calculation and seeing whether the calculation checks. The CRC is made UE-specific by including the UE's (or UEs') radio network temporary identifier (RNTI) in the CRC calculation. LTE also defines search spaces to limit the set of CCEs that the UE needs to monitor in order to detect a PDCCH intended for it.

If a UE has already been allocated PUSCH resources in an uplink subframe in which control signaling such as a hybrid-ARQ acknowledgement is to be sent, the control signaling can be time multiplexed with data in the PUSCH. Otherwise, the PUCCH is used. Each PUCCH resource is made up of one resource block within each of two slots of an uplink subframe. Control signaling from multiple UEs can be multiplexed into a single PUCCH region with a combination of time-domain and frequency-domain code division multiplexing. A symbol constituting the control signaling is multiplied by an orthogonal cover sequence to effect spreading in time, and the resulting symbols are then used to modulate a phase rotated (corresponding to a cyclic shift in the time domain) length-12 reference signal sequence in the frequency domain to effect spreading in frequency. The resource used by a PUCCH is thus not only specified in the time-frequency domain by its assigned resource blocks, but also by the cyclic shift and orthogonal cover sequence applied. By assigning different cyclic shifts and orthogonal cover sequences to different UEs, PUCCHs may be transmitted by different UEs using the same time-frequency resource.

A hybrid-ARQ acknowledgement is sent via a single BPSK or QPSK (binary or quadrature phase shift keying) symbol that is code division multiplexed in a PUCCH in the manner just described to spread the symbol over the pair of resource blocks in what is referred to as a Format 1 PUCCH. A PUCCH Format 1 resource is represented by a PUCCH index, $n_{PUCCH}^{(1)}$, from which the resource block pair, the phase rotation, and the orthogonal cover sequence are derived in the manner described by the LTE specifications (See 3GPP TS 36.211 Release 10).

Downlink scheduling assignments to a UE apply to the same subframe in which they are transmitted. In the situation where a UE receives a PDSCH allocation in a particular subframe, the UE needs to send a hybrid-ARQ acknowledgement in a designated subsequent subframe. The UE may use a previously allocated uplink resource in that subsequent subframe (i.e., either a PUSCH or PUCCH resource). Otherwise, for a hybrid-ARQ acknowledgement in a Format 1 PUCCH, the eNB allocates the uplink resource in the same PDCCH that allocates the PDSCH containing the data which is to be acknowledged by indicating the PUCCH index to use as a function of the lowest CCE index found in the detected PDCCH. The eNB thus implicitly signals the uplink resource allocation to the UE.

In the case of FDD, there is a one-to-one correspondence between downlink subframes transmitting data and uplink subframes transmitting hybrid-ARQ acknowledgements for that data. In TDD, on the other hand, an asymmetric allocation of uplink and downlink subframes may necessitate that a single uplink subframe be used to acknowledge multiple downlink subframes, the latter group of downlink subframes being referred to as a bundling window. Multiple PUCCH resource block pairs and the code division multiplexing described above may be used to transmit multiple hybrid-ARQ acknowledgements from the same or multiple UEs in the same subframe.

PUCCH Mapping Schemes for ePDCCH

Described herein are PUCCH resources mapping methods for TDD hybrid-ARQ multiplexing mode that may include multiplexing for UEs without carrier aggregation defined in 3GPP Release and multiplexing for PUCCH Format 1b with channel selection for UEs with carrier aggregation as defined in 3GPP Release 10. In the described mapping schemes, the PUCCH resources mapping is based on the corresponding lowest PRB index of the ePDCCH implicitly so that no PUCCH collision issue occurs. Nor are any scheduling constraints imposed upon the eNB scheduler. The mapping schemes also allow for the interleaving of PUCCH resources for different subframes in the same bundling window to compress and reduce the PUCCH overhead, and, consequently to increase the PUSCH throughput.

Figure 2:
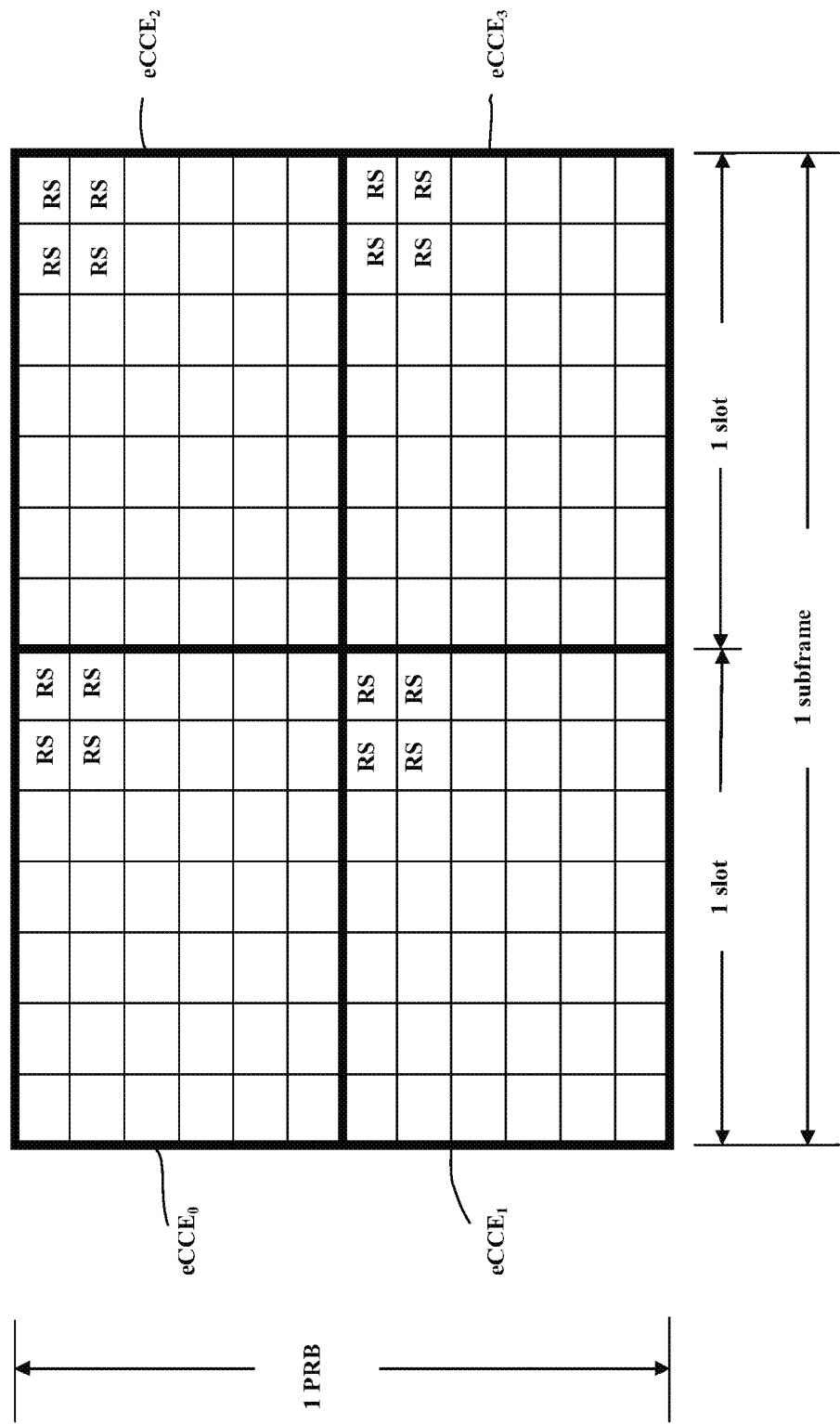
FIG. 2 illustrates the resource element mapping for enhanced control channel elements in an ePDCCH in accordance with some embodiments

As defined herein, an ePDCCH is composed of enhanced control channel elements (eCCEs) where one eCCE consists of a set of predefined REs within the PRB pairs that are used for defining the mapping of the ePDCCH to resource elements. FIG. 2 shows an embodiment where there are four indexed eCCEs in each PRB pair used for the ePDCCH. Note that an eCCE may contain REs that are reserved for other signals, such as CRS (cell-specific reference signal) and CSI-RS (channel state information reference signal) designated as RS in the figure.

For TDD hybrid-ARQ multiplexing and a subframe n with bundling window size M>1, where M is the number of elements in the set K defined in Table 10.1.1 of 3GPP TS 36.213, denote $n_{PUCCH,i}^{(1)}$ as the PUCCH resources derived from subframe n-$k_i$ and HARQ-ACK(i) as the hybrid-ARQ response for subframe n-$k_i$, where $k_i$ K and $0 \le i \le M-1$. For a PDSCH transmission or a PDCCH indicating downlink SPS (semi-persistent scheduling) release in subframe n-$k_i$, the PUCCH resources correspondingly used for hybrid-ARQ feedback in subframe n may be calculated using different mapping schemes as described below.

For each ePDCCH detected in subframe n-$k_i$, the following symbols are used in the example mapping schemes described below to determine the corresponding PUCCH resource index $n_{PUCCH,i}^{(1)}$.

- $n_{eCCE}$: the index of the lowest eCCE in the ePDCCH detected in subframe n-$k_i$, $0 \le n_{eCCE} < E$.
- E: the number of eCCEs in one PRB (E=4 is used in the example embodiments described herein).
- $I_{PRB\_ePDCCH}^{lowest\_index}$: the lowest PRB index including at least one eCCE of the ePDCCH detected in the subframe n-$k_i$. Note that the eCCE within the lowest PRB index may be part or full of ePDCCH resources.
- $N_{RB,ePDCCH}^i$: either a cell-specific or a UE-specific parameter that indicates the ePDCCH PRBs reserved for use in transmitting the ePDCCH in a downlink subframe from a system perspective or a UE-specific perspective. It is signaled semi-statically by higher layer signaling or dynamically signaled in each downlink subframe through a special physical channel such as the physical control format information channel (PCFICH) channel in as specified in Release 8 or as determined by a UE implicitly according to system bandwidth as $N_{RB,ePDCCH}^i = N_{RB}^{DL}$, where $N_{RB}^{DL}$ is the number of PRBs in the system downlink bandwidth configuration as defined in 3GPP TS 36.211. It should be noted that, in the mapping schemes discussed below, the PUCCH resources reserved for PUCCH transmission may be minimized with an appropriate setting for $N_{RB,ePDCCH}^i$. Consequently, more uplink PRBs could be used for PUSCH transmission to result in a higher uplink throughput.
- Δ: provided by higher layer or implicit mapping depending on bundling window size, e.g., Δ=M·Q, where Q≥1.
- $N_{PRB,ePDCCH}^{offset}$: indicates the lowest PRB index for ePDCCH transmission, configured by higher layers in UE-specific or cell-specific way.
- $N_{ePUCCH}^{(1)}$: indicates the PUCCH resources offset for the ePDCCH, configured by higher layers in a UE-specific or cell-specific way.

In a first mapping scheme, the PUCCH resources are mapped implicitly subframe by subframe using the following equation:

$$n_{PUCCH,i}^{(1)} = E \cdot \left( \sum_{l=0}^{i-1} N_{RB,ePDCCH}^l + (I_{PRB\_ePDCCH}^{lowest\_index} - N_{PRB,ePDCCH}^{offset}) \right) + n_{eCCE} + N_{ePUCCH}^{(1)}$$

Figure 3:
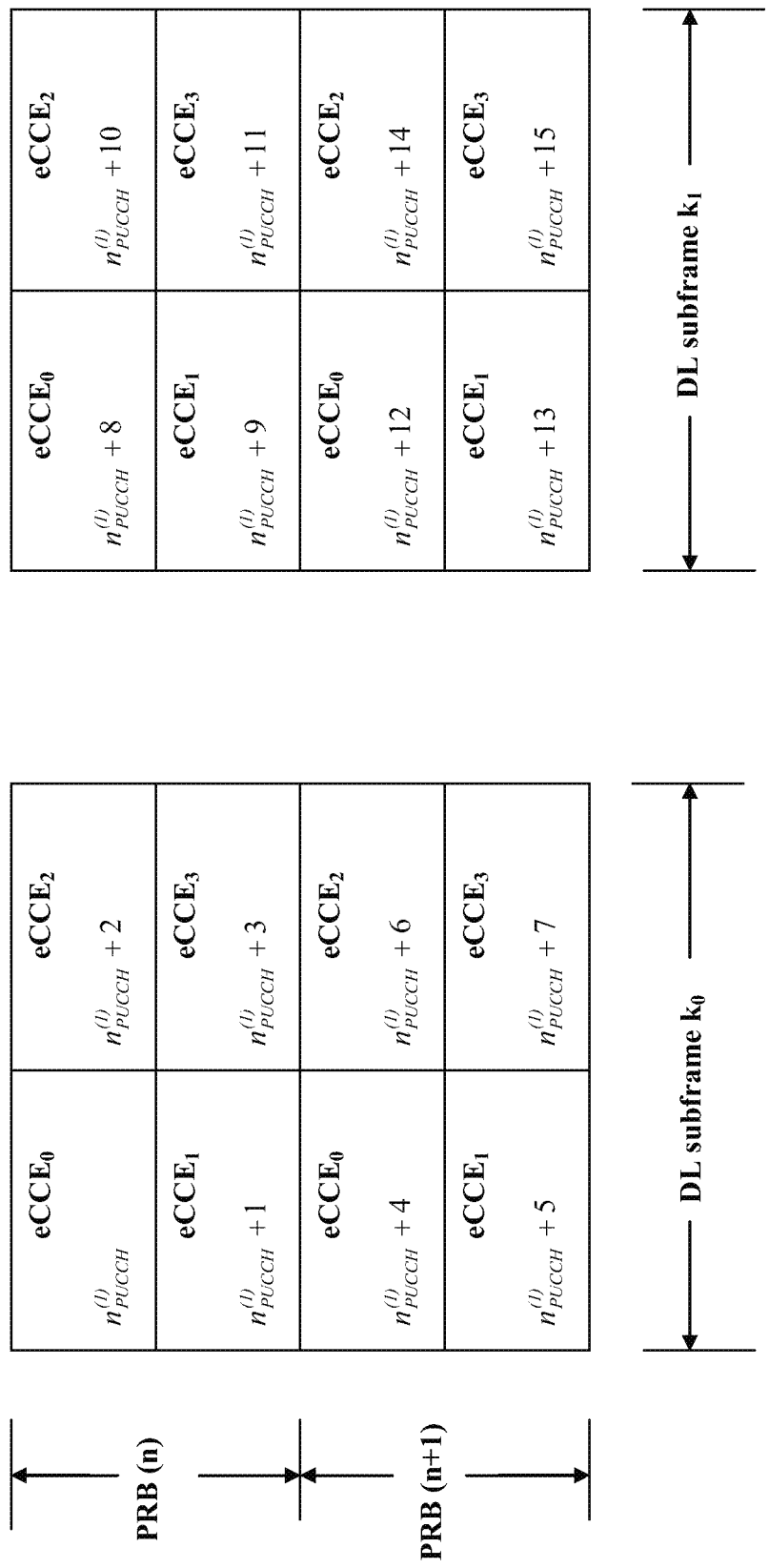
FIGS. 3 through 7 illustrate example schemes for mapping PUCCH resources as derived from a detected ePDCCH in accordance with some embodiments.

One embodiment of this scheme is as shown in FIG. 3 where it is assumed that $N_{RB,ePDCCH}^i = N = 2$ and that $N_{ePUCCH}^{(1)} = 0$.

In a second mapping scheme, a time-domain first mapping of the PUCCH resources along with PRB-level interleaving is performed using the following equation:

$$n_{PUCCH,i}^{(1)} = E \cdot \Delta \cdot (I_{PRB\_ePDCCH}^{lowest\_index} - N_{PRB,ePDCCH}^{offset}) + n_{eCCE} + E \cdot i + N_{ePUCCH}^{(1)}$$

Figure 4:
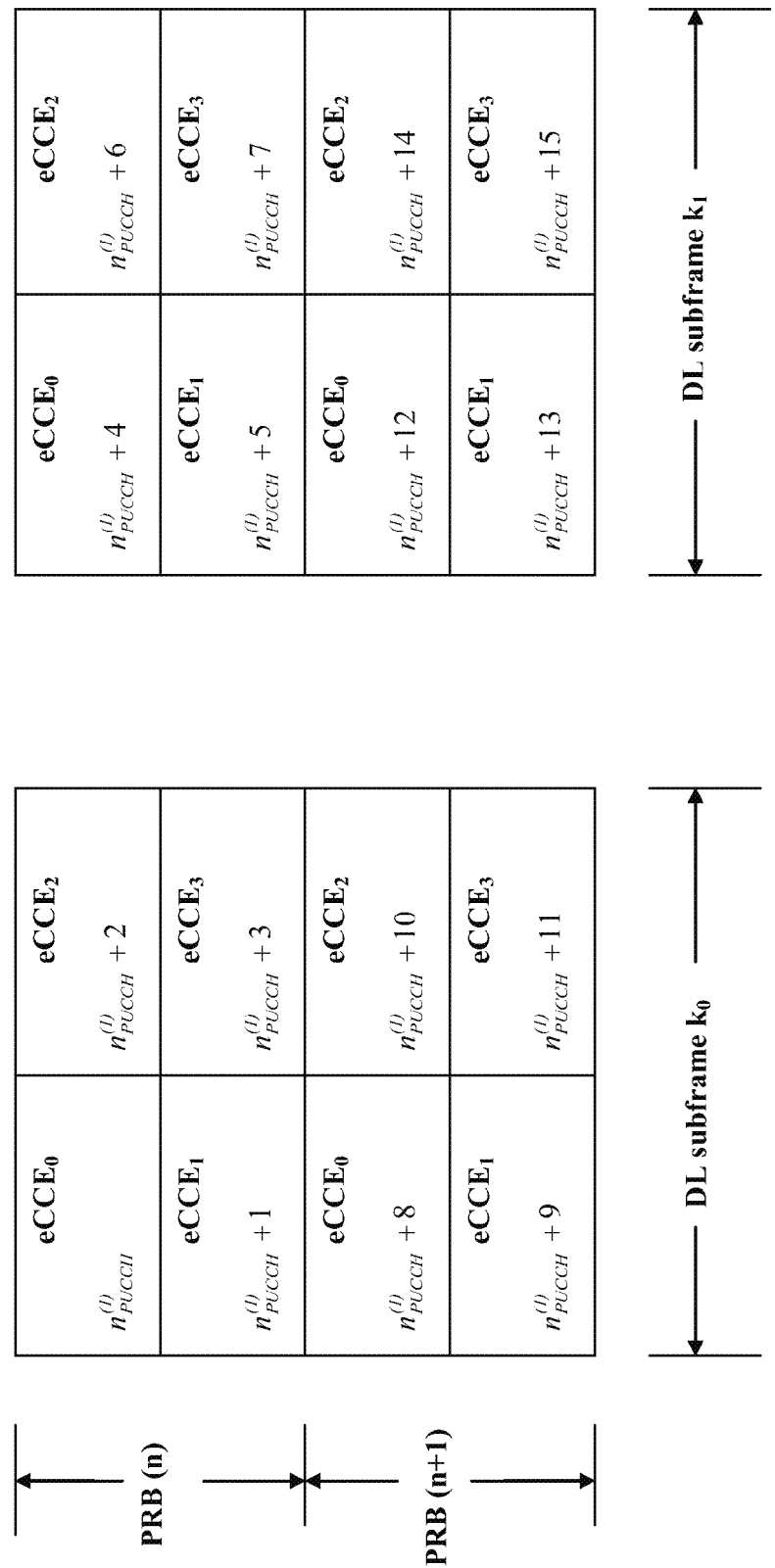

An example mapping pattern is as shown in FIG. 4 where it is assumed that Q=1 and M=2.

In a third mapping scheme, a frequency-domain first mapping of the PUCCH resources along with slot-level interleaving is performed as follows. First, a value p is selected from {0,1} that satisfies:

$$N_p \le n_{eccE} < N_{p+1}$$

where $N_0=0$, $N_1=2$, and $N_2=4$.
The PUCCH resource is then calculated as:

$$n_{PUCCH,i}^{(1)} = E/2 \cdot (I_{PRB\_ePDCCH}^{lowest\_index} - N_{PRB,ePDCCH}^{offset}) + \quad (3)$$
$$n_{eCCE} + F_1 + F_1 + \delta_i + N_{ePUCCH}^{(1)}$$

where:

$$F_1 = \sum_{l=0}^{l=M-i-2} N_{RB,ePDCCH}^{M-l-1} \cdot N_p \quad (4)$$

$$F_2 = \sum_{j=0}^{i} N_{RB,ePDCCH}^j \cdot N_{p+1}$$

$$\delta_i = (N_{RB,ePDCCH}^i - I_{PRB\_ePDCCH}^{lowest\_index} - 1) \cdot E/2 \cdot p$$

If $N_{RB,ePDCC}^i$=a constant value N for each downlink subframe in the bundling window, then equations (4), (5), and (6) can be simplified as:

$$F_1 = \sum_{l=0}^{l=M-i-2} N_{RB,ePDCCH}^{M-l-1} \cdot N_p = (M-i-1) \cdot N \cdot N_p$$

$$F_2 = \sum_{j=0}^{i} N_{RB,ePDCCH}^j \cdot N_{p+1} = i \cdot N \cdot N_p$$

$$\delta_i = (N - I_{PRB\_ePDCCH}^{lowest\_index} - 1) \cdot E/2 \cdot p$$

Figure 5:
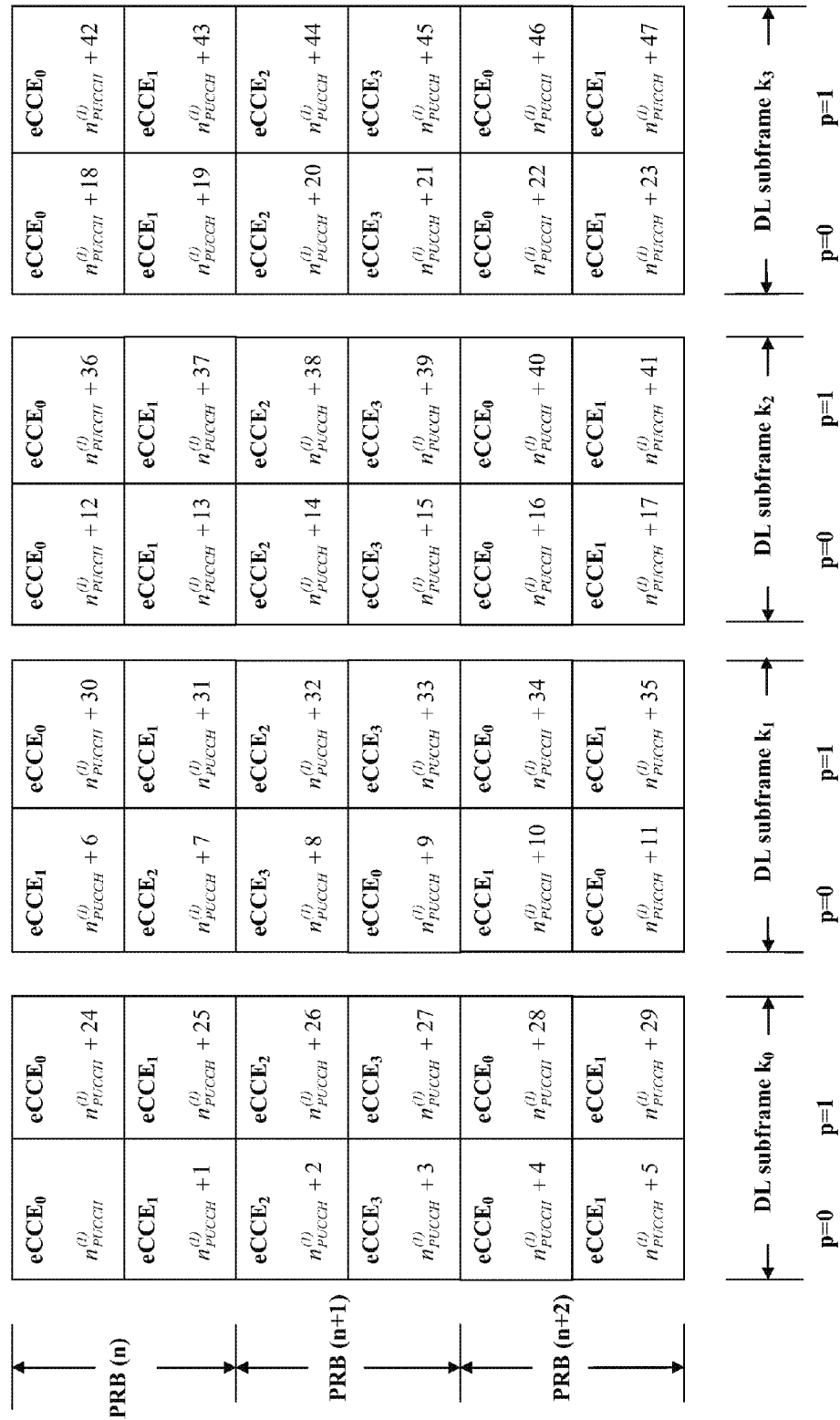

An example mapping pattern produced by this mapping scheme is as shown in FIG. 5.

In a fourth mapping scheme, the PUCCH resources are mapped with slot-level interleaving. First, a value p is selected from {0,1} that satisfies:

$$N_p \le n_{eCCE} < N_{p+1}$$

where $N_0=0$, $N_1=2$, and $N_2=4$.
The PUCCH resource is then calculated as:

$$n_{PUCCH,i}^{(1)} = E \cdot \Delta \cdot (I_{PRB\_ePDCCH}^{lowest\_index} - N_{PRB,ePDCCH}^{offset}) + n_{eCCE} + (M-i-1) \cdot N_p + i \times N_{p+1} + N_{ePUCCH}^{(1)}$$

Figure 6:
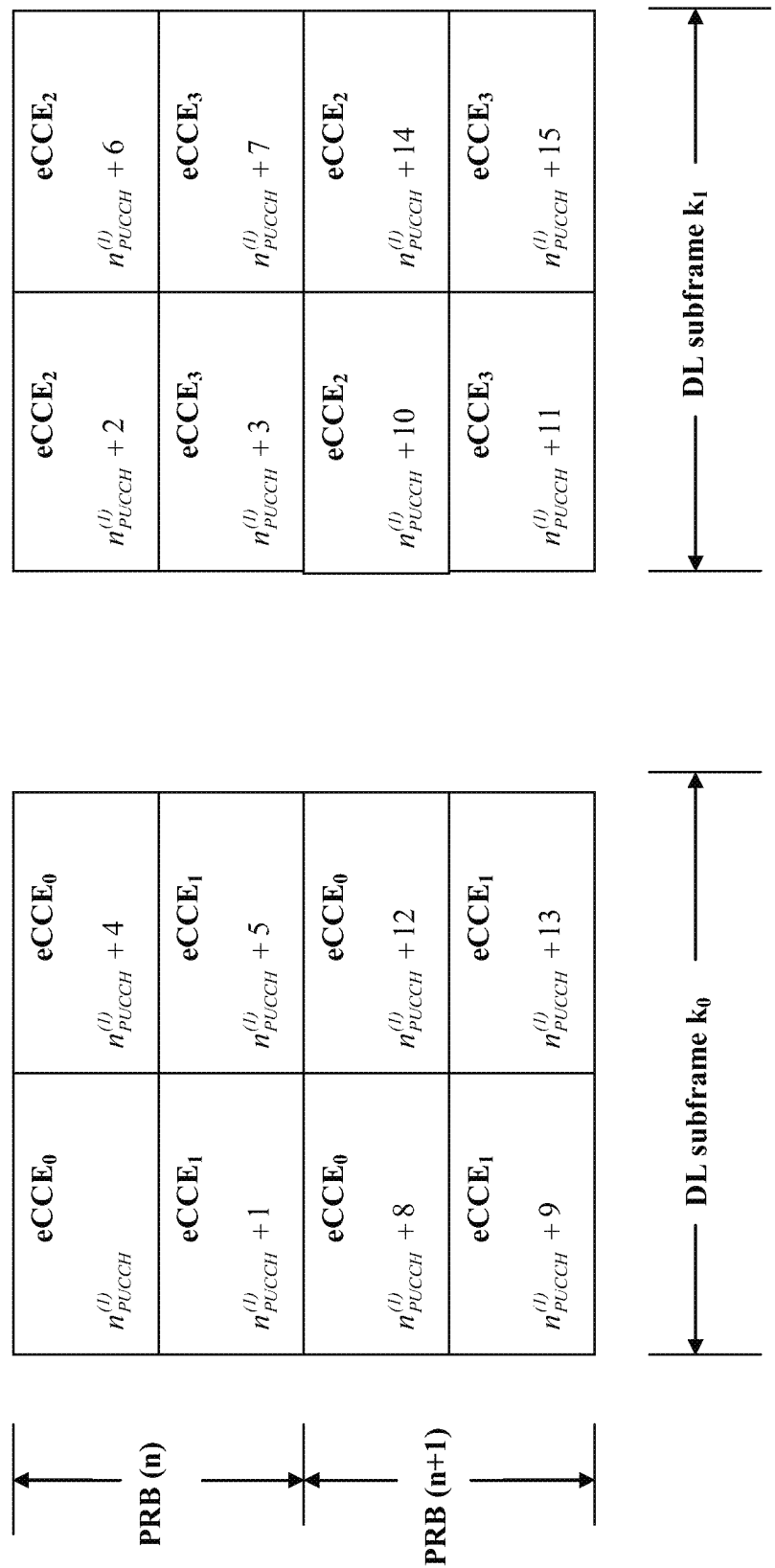

In the example of this mapping scheme illustrated by FIG. 6, it is assumed that Q=1 and M=2.

In a fifth mapping scheme, the PUCCH resources are mapped with eCCE-level interleaving using the following equation:

$$n_{PUCCH,i}^{(1)} = \Delta \cdot (E \cdot (I_{PRB\_ePDCCH}^{lowest\_index} - N_{PRB,ePDCCH}^{offset}) + n_{eCCE}) + i + N_{ePUCCH}^{(1)}$$

Figure 7:
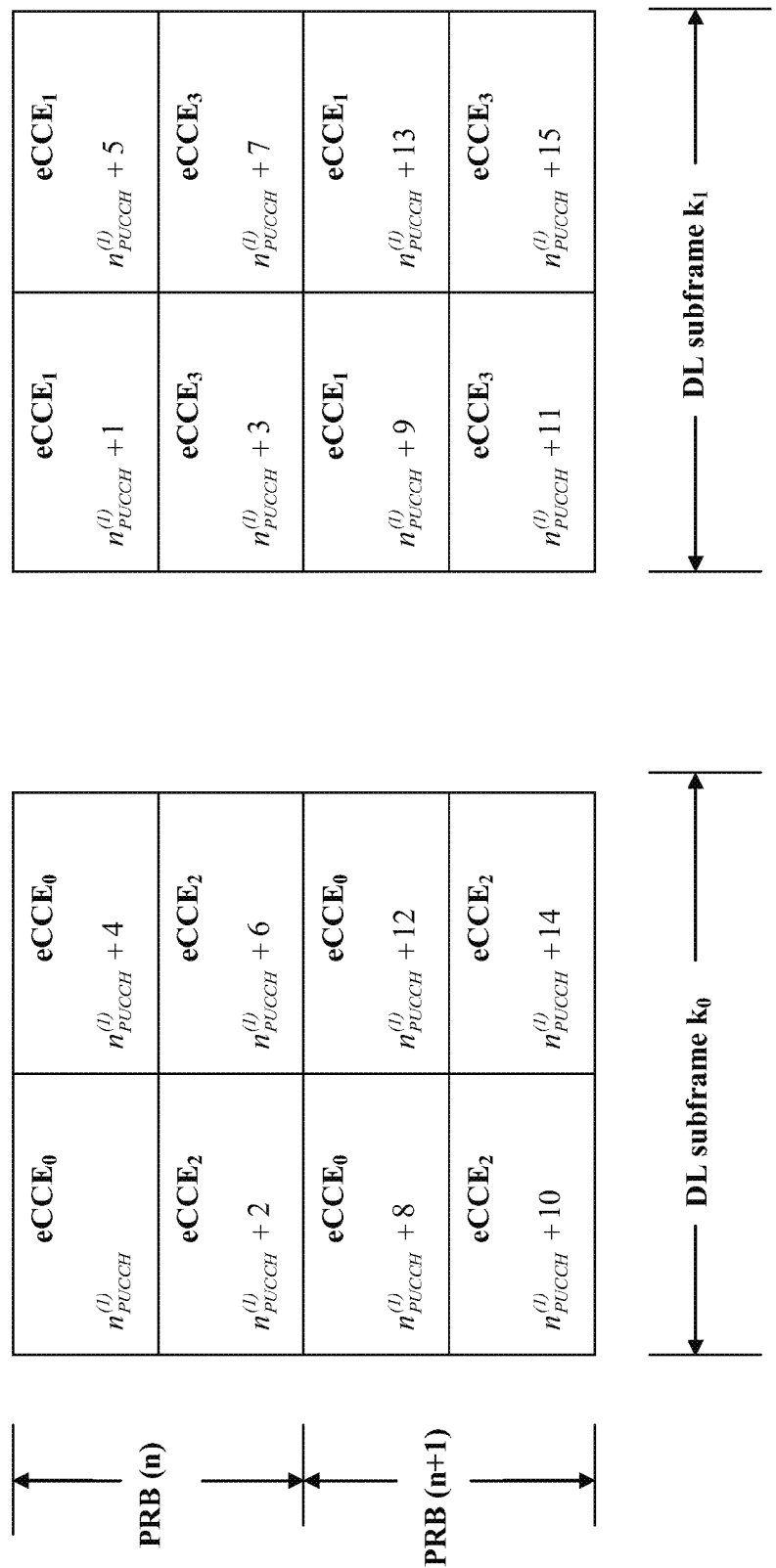

In the example of this mapping scheme illustrated by FIG. 7, it is assumed that Q=1 and M=2.

Example Embodiments

In a first embodiment, a device operating as a UE in an LTE network comprises an RF transceiver for providing an LTE air interface for communicating with a base station operating as an eNB and processing circuitry to: receive transmitted downlink resource allocations from an eNB in an ePDCCH made up of one or more indexed eCCEs) contained within indexed PRBs; and, transmit a hybrid-ARQ acknowledgement corresponding to a detected ePDCCH allocating PDSCH resources via a PUCCH resource that is implicitly indicated by the detected ePDCCH. The ePDCCH may be detected in a downlink subframe belonging to a specified bundling window of M indexed downlink subframes. The PUCCH resource may be defined by a PUCCH resource index $n_{PUCCH,i}^{(1)}$ that is a function of subframe index, PRB index, and eCCE index. The PUCCH index may be defined as a function of subframe index, lowest index of a PB containing at least one eCCE in the detected ePDCCH, and lowest eCCE index.

In a second embodiment, a device operating as an eNB in an LTE network, comprises: an RF transceiver for providing an LTE air interface for communicating with a UE and processing circuitry to: transmit data to a UE (user equipment) via a downlink physical downlink shared channel (PDSCH) in a subframe; allocate PDSCH resources to the UE for the subframe in an enhanced physical downlink control channel (ePDCCH) made up of one or more enhanced control channel elements (eCCEs) contained within physical resource blocks (PRBs) that indexed in a cell-specific manner; and allocate a physical uplink control channel (PUCCH) resource to the UE for acknowledging the transmitted data by implicitly indicating the PUCCH resource in the ePDCCH. The processing circuitry may be further to, for an ePDCCH allocating downlink resources to a UE in a subframe belonging to a specified bundling window of M indexed subframes, receive a hybrid-ARQ acknowledgement corresponding to each eCCE of the ePDCCH via a physical uplink control channel (PUCCH) resource defined by a PUCCH resource index $n_{PUCCH,i}^{(1)}$ that is a function of: subframe index, PRB index, and eCCE index. The PUCCH index may be defined as a function of subframe index, lowest index of a PRB containing at least one eCCE in the detected ePDCCH, and lowest eCCE index.

In either of the first or second embodiments, the processing circuitry may be further configured such that: for each subframe in the bundling window having an ePDCCH allocating downlink resources, the PUCCH resource index $n_{PUCCH,i}^{(1)}$ is calculated such that consecutive PUCCH resource indices are mapped to by those ePDCCHs ordered in accordance with an ordered list of the eCCEs making up the ePDCCHs where the eCCEs are ordered first according to subframe index, then according to PRB index, and then according to eCCE index. An example of the mapping pattern produced by this embodiment is as shown in FIG. 3.

In either of the first or second embodiments, the processing circuitry may be further configured such that: for each subframe in the bundling window having an ePDCCH allocating downlink resources, the PUCCH resource index $n_{PUCCH,i}^{(1)}$ is calculated such that consecutive PUCCH resource indices are mapped to by those ePDCCHs ordered in accordance with an ordered list of the eCCEs making up the ePDCCHs where the eCCEs are ordered first according to PRB index, then according to subframe index, and then according to eCCE index. An example of the mapping pattern produced by this embodiment is as shown in FIG. 4.

In either of the first or second embodiments, the processing circuitry may be further configured such that: for each subframe in the bundling window having an ePDCCH allocating downlink resources, the PUCCH resource index $n_{PUCCH,i}^{(1)}$ is calculated such that consecutive PUCCH resource indices are mapped to by those ePDCCHs ordered in accordance with an ordered list of the eCCEs making up the ePDCCHs where the eCCEs are ordered first according to slot number within the subframe, then according to subframe index, then according to PRB index, and then according to eCCE index. An example of the mapping pattern produced by this embodiment is as shown in FIG. 5.

In either of the first or second embodiments, the processing circuitry may be further configured such that: for each subframe in the bundling window having an ePDCCH allocating downlink resources, the PUCCH resource index $n_{PUCCH,i}^{(1)}$ is calculated such that consecutive PUCCH resource indices are mapped to by those ePDCCHs ordered in accordance with an ordered list of the eCCEs making up the ePDCCHs where the eCCEs are ordered first according to PRB index, then according to slot number within the subframe, then according to subframe index, and then according to eCCE index. An example of the mapping pattern produced by this embodiment is as shown in FIG. 6.

In either of the first or second embodiments, the processing circuitry may be further configured such that: for each subframe in the bundling window having an ePDCCH allocating downlink resources, the PUCCH resource index $n_{PUCCH,i}^{(1)}$ is calculated such that consecutive PUCCH resource indices are mapped to by those ePDCCHs ordered in accordance with an ordered list of the eCCEs making up the ePDCCH where the eCCEs are ordered first according to PRB index, then according to eCCE index, then according to subframe index. An example of the mapping pattern produced by this embodiment is as shown in FIG. 7.

In either of the first or second embodiments, the processing circuitry may be further configured such that: for each ePDCCH detected in a subframe n-$k_i$, the PUCCH resource index $n_{PUCCH,i}^{(1)}$ for transmission in a subframe n is calculated as:

$$n_{PUCCH,i}^{(1)} = E \cdot \left( \sum_{l=0}^{i-1} N_{RB,ePDCCH}^{l} + (I_{PRB\_ePDCCH}^{lowest\_index} - N_{PRB,ePDCCH}^{offset}) \right) + n_{eCCE} + N_{ePUCCH}^{(1)}$$

where n is an integer, K is the set of downlink subframe indexes in the bundling window of subframe n, M is the number of downlink subframes in the bundling window, $k_i$ K, $0 \leq i \leq M-1$, $N_{RB,ePDCCH}^{i}$ indicates the ePDCCH physical resource blocks (PRBs) reserved for use in transmitting the ePDCCH in a downlink subframe, $I_{PRB\_ePDCCH}^{lowest\_index}$ is the lowest PRB index including at least one eCCE of the ePDCCH detected in the subframe n-$k_i$, $N_{PRB,ePDCCH}^{offset}$ indicates the lowest PRB index for ePDCCH transmission, E is the number of eCCEs in one PRB, $n_{eCCE}$ is the lowest index of the eCCE in the ePDCCH detected in subframe n-$k_i$, $0 \leq n_{eCCE} < E$, which is mapped to a PUCCH resource index $n_{PUCCH,i}^{(1)}$, and $N_{ePUCCH}^{(1)}$ indicates the PUCCH resources offset for the ePDCCH.

In either of the first or second embodiments, the processing circuitry may be further configured such that: for each ePDCCH detected in a subframe n-$k_i$, the PUCCH resource index $n_{PUCCH,i}^{(1)}$ for transmission in a subframe n is calculated as:

$$n_{PUCCH,i}^{(1)} = E \cdot \Delta \cdot (I_{PRB\_ePDCCH}^{lowest\_index} - N_{PRB,ePDCCH}^{offset}) + n_{eCCE} + E \cdot i + N_{ePUCCH}^{(1)}$$

where n is an integer, K is the set of downlink subframe indexes in the bundling window of subframe n, M is the number of downlink subframes in the bundling window, $k_i$, K, $0 \leq i \leq M-1$, $N_{RB,ePDCCH}^i$ indicates the ePDCCH physical resource blocks (PRBs) reserved for use in transmitting the ePDCCH in a downlink subframe, $I_{PRB\_ePDCCH}^{lowest\_index}$ is the lowest PRB index including at least one eCCE of the ePDCCH detected in the subframe n-$k_i$, $N_{PRB,ePDCCH}^{offset}$ indicates the lowest PRB index for ePDCCH transmission, E is the number of eCCEs in one PRB, $n_{eCCE}$ is the lowest index of the eCCE in the ePDCCH detected in subframe n-$k_i$, $0 \leq n_{eCCE} < E$, which is mapped to a PUCCH resource index $n_{PUCCH,i}^{(1)}$, $N_{ePUCCH}^{(1)}$ indicates the PUCCH resources offset for the ePDCCH, and $\Delta$ is a specified integer that depends upon the size of the bundling window.

In either of the first or second embodiments, the processing circuitry may be further configured such that the PUCCH resource index $n_{PUCCH,i}^{(1)}$ for transmission in a subframe n is calculated by selecting a value p from {0,1} that satisfies:

$$N_p \leq n_{eCCE} < N_{p+1}$$

where $N_0=0$, $N_1=2$, and $N_2=4$
and calculating $n_{PUCCH,i}^{(1)}$ as:

$$n_{PUCCH,i}^{(1)} = E/2 \cdot (I_{PRB\_ePDCCH}^{lowest\_index} - N_{PRB,ePDCCH}^{offset}) + n_{eCCE} + F_1 + F_1 + \delta_i + N_{ePUCCH}^{(1)}$$

where n is an integer, K is the set of downlink subframe indexes in the bundling window of subframe n, M is the number of downlink subframes in the bundling window, $k_i$, K, $0 \leq i \leq M-1$, $N_{RB,ePDCCH}^i$ indicates the ePDCCH physical resource blocks (PRBs) reserved for use in transmitting the ePDCCH in a downlink subframe, $I_{PRB\_ePDCCH}^{lowest\_index}$ is the lowest PRB index including at least one eCCE of the ePDCCH detected in the subframe n-$k_i$, $N_{PRB,ePDCCH}^{offset}$ indicates the lowest PRB index for ePDCCH transmission, E is the number of eCCEs in one PRB, $n_{eCCE}$ is the lowest index of the eCCE in the ePDCCH detected in subframe n-$k_i$, $0 \leq n_{eCCE} < E$, which is mapped to a PUCCH resource index $n_{PUCCH,i}^{(1)}$, $N_{ePUCCH}^{(1)}$ indicates the PUCCH resources offset for the ePDCCH, $\Delta$ is a specified integer that depends upon the size of the bundling window, and where:

$$F_1 = \sum_{l=0}^{l=M-i-2} N_{RB,ePDCCH}^{M-l-1} \cdot N_p,$$

$$F_2 = \sum_{j=0}^{i} N_{RB,ePDCCH}^{j} \cdot N_{p+1},$$

and $$\delta_i = (N_{RB,ePDCCH}^i - I_{PRB\_ePDCCH}^{lowest\_index} - 1) \cdot E/2 \cdot p.$$

In either of the first or second embodiments, the processing circuitry may be further configured such that the PUCCH resource index $n_{PUCCH,i}^{(1)}$ for transmission in a subframe n is calculated by selecting a value p from {0,1} that satisfies:

$$N_p \leq n_{eCCE} < N_{p+1}$$

where $N_0=0$, $N_1=2$, and $N_2=4$
and calculating $n_{PUCCH,i}^{(1)}$ as:

$$n_{PUCCH,i}^{(1)} = E \cdot \Delta \cdot (I_{PRB\_ePDCCH}^{lowest\_index} - N_{PRB,ePDCCH}^{offset}) + n_{eCCE} + (M-i-1) \cdot N_p + i \times N_{p+1} + N_{ePUCCH}^{(1)}$$

where n is an integer, K is the set of downlink subframe indexes in the bundling window of subframe n, M is the number of downlink subframes in the bundling window, $k_i$, K, $0 \leq i \leq M-1$, $N_{RB,ePDCCH}^i$ indicates the ePDCCH physical resource blocks (PRBs) reserved for use in transmitting the ePDCCH in a downlink subframe, $I_{PRB\_ePDCCH}^{lowest\_index}$ is the lowest PRB index including at least one eCCE of the ePDCCH detected in the subframe n-$k_i$, $N_{PRB,ePDCCH}^{offset}$ indicates the lowest PRB index for ePDCCH transmission, E is the number of eCCEs in one PRB, $n_{eCCE}$ is the lowest index of the eCCE in the ePDCCH detected in subframe n-$k_i$, $0 \leq n_{eCCE} < E$, which is mapped to a PUCCH resource index $n_{PUCCH,i}^{(1)}$, $N_{ePUCCH}^{(1)}$ indicates the PUCCH resources offset for the ePDCCH, $\Delta$ is a specified integer that depends upon the size of the bundling window.

In either of the first or second embodiments, the processing circuitry may be further configured such that: for each ePDCCH detected in a subframe n-$k_i$, the PUCCH resource index $n_{PUCCH,i}^{(1)}$ for transmission in a subframe n is calculated as:

$$n_{PUCCH,i}^{(1)} = \Delta \cdot (E \cdot (I_{PRB\_ePDCCH}^{lowest\_index} - N_{PRB,ePDCCH}^{offset}) + n_{eCCE}) + i + N_{ePUCCH}^{(1)}$$

where n is an integer, K is the set of downlink subframe indexes in the bundling window of subframe n, M is the number of downlink subframes in the bundling window, $k_i$, K, $0 \leq i \leq M-1$, $N_{RB,ePDCCH}^i$, indicates the ePDCCH physical resource blocks (PRBs) reserved for use in transmitting the ePDCCH in a downlink subframe, $I_{PRB\_ePDCCH}^{lowest\_index}$ is the lowest PRB index including at least one eCCE of the ePDCCH detected in the subframe n-$k_i$, $N_{PRB,ePDCCH}^{offset}$ indicates the lowest PRB index for ePDCCH transmission, E is the number of eCCEs in one PRB, $n_{eCCE}$ is the lowest index of the eCCE in the ePDCCH detected in subframe n-$k_i$, $0 \leq n_{eCCE} < E$, which is mapped to a PUCCH resource index $n_{PUCCH,i}^{(1)}$, $N_{ePUCCH}^{(1)}$ indicates the PUCCH resources offset for the ePDCCH, and $\Delta$ is a specified integer that depends upon the size of the bundling window.

In any of the above embodiments, the processing circuitry may be further configured such that the PUCCH resource index $n_{PUCCH,i}^{(1)}$ is calculated as a function of a PUCCH resource offset $N_{ePUCCH}^{(1)}$ for the ePDCCH that is configured by higher layers. The PUCCH resource offset $N_{ePUCCH}^{(1)}$ for the ePDCCH may, for example, be a UE-specific parameter determined by the eNB.

The embodiments as described above may be implemented as methods for operation and/or in various hardware configurations that may include a processor for executing instructions that perform the methods. Such instructions may be contained in a suitable storage medium from which they are transferred to a memory or other processor-executable medium.

The subject matter has been described in conjunction with the foregoing specific embodiments. It should be appreciated that those embodiments may also be combined in any manner considered to be advantageous. Also, many alternatives, variations, and modifications will be apparent to those of ordinary skill in the art. Other such alternatives, variations, and modifications are intended to fall within the scope of the following appended claims.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method for operating a UE (user equipment) in an LTE (Long Term Evolution) network using TDD (time division duplex) mode, comprising:
   receiving transmitted downlink resource allocations from an eNB (evolved Node B) in an enhanced physical downlink control channel (ePDCCH) made up of one or more indexed enhanced control channel elements (eCCEs) contained within indexed physical resource blocks (PRBs);
   transmitting a hybrid-ARQ acknowledgement corresponding to a detected ePDCCH allocating physical downlink shared channel (PDSCH) resources via a physical uplink control channel (PUCCH) resource that is implicitly indicated by the detected ePDCCH; and,
   wherein the ePDCCH is detected in a downlink subframe belonging to a specified bundling window of M indexed downlink subframes and wherein the PUCCH resource is defined by a PUCCH resource index $n_{PUCCH,i}^{(1)}$ and further comprising, for each subframe in the bundling window having an ePDCCH allocating downlink resources, calculating the PUCCH resource index $n_{PUCCH,i}^{(1)}$ such that consecutive PUCCH resource indices are mapped to by the ePDCCHs ordered in accordance with an ordered list of the eCCEs making up the ePDCCHs where the eCCEs are: 1) ordered first according to subframe index, then according to PRB index, and then according to eCCE index, 2) ordered first according to PRB index, then according to subframe index, and then according to eCCE index, 3) ordered first according to slot number within the subframe, then according to subframe index, then according to PRB index, and then according to eCCE index, 4) ordered first according to PRB index, then according to slot number within the subframe, then according to subframe index, and then according to eCCE index, or 5) ordered first according to PRB index, then according to eCCE index, then according to subframe index.

2. The method of claim 1 wherein the ePDCCH is detected in a downlink subframe belonging to a specified bundling window of M indexed downlink subframes and wherein the PUCCH resource is defined by a PUCCH resource index $n_{PUCCH,i}^{(1)}$ that is a function of subframe index, lowest index of a PRB containing at least one eCCE in the detected ePDCCH, and lowest eCCE index.

3. The method of claim 2 further comprising, for each ePDCCH detected in a subframe n-$k_i$, calculating the PUCCH resource index $n_{PUCCH,i}^{(1)}$ for transmission in a subframe n as:

$$n_{PUCCH,i}^{(1)} = E \cdot \left( \sum_{l=0}^{i-1} N_{RB,ePDCCH}^l + (I_{PRB\_ePDCCH}^{lowest\_index} - N_{PRB,ePDCCH}^{offset}) \right) + n_{eCCE} + N_{ePUCCH}^{(1)}$$

where n is an integer, K is the set of downlink subframe indexes in the bundling window of subframe n, M is the number of downlink subframes in the bundling window, $k_i \in K$, $0 \le i \le M-1$, $N_{RB,ePDCCH}^i$ indicates the ePDCCH physical resource blocks (PRBs) reserved for use in transmitting the ePDCCH in a downlink subframe, $I_{PRB\_ePDCCH}^{lowest\_index}$ is the lowest PRB index including at least one eCCE of the ePDCCH detected in the subframe n-$k_i$, $N_{PRB,ePDCCH}^{offset}$ indicates the lowest PRB index for ePDCCH transmission, E is the number of eCCEs in one PRB, $n_{eCCE}$ is the lowest index of the eCCE in the ePDCCH detected in subframe n-$k_i$, $0 \le n_{eCCE} < E$, which is mapped to a PUCCH resource index $n_{PUCCH,i}^{(1)}$, and $N_{ePUCCH}^{(1)}$ indicates the PUCCH resources offset for the ePDCCH.

4. The method of claim 3 wherein the PUCCH resources offset $N_{ePUCCH}^{(1)}$ is a UE-specific parameter determined by the eNB.

5. The method of claim 2 further comprising, for each ePDCCH detected in a subframe n-$k_i$, calculating the PUCCH resource index $n_{PUCCH,i}^{(1)}$ for transmission in a subframe n as:

$$n_{PUCCH,i}^{(1)} = E \cdot \Delta \cdot (I_{PRB\_ePDCCH}^{lowest\_index} - N_{PRB,ePDCCH}^{offset}) + n_{eCCE} + E \cdot i + N_{ePUCCH}^{(1)}$$

where n is an integer, K is the set of downlink subframe indexes in the bundling window of subframe n, M is the number of downlink subframes in the bundling window, $k_i \in K$, $0 \le i \le M-1$, $N_{RB,ePDCCH}^i$ indicates the ePDCCH physical resource blocks (PRBs) reserved for use in transmitting the ePDCCH in a downlink subframe, $I_{PRB\_ePDCCH}^{lowest\_index}$ is the lowest PRB index including at least one eCCE of the ePDCCH detected in the subframe n-$k_i$, $N_{PRB,ePDCCH}^{offset}$ indicates the lowest PRB index for ePDCCH-H transmission, E is the number of eCCEs in one PRB, $n_{eCCE}$ is the lowest index of the eCCE in the ePDCCH detected in subframe n-$k_i$, $0 \le n_{eCC} < E$, which is mapped to a PUCCH resource index $n_{PUCCH,i}^{(1)}$, $N_{ePUCCH}^{(1)}$, indicates the PUCCH resources offset for the ePDCCH, and $\Delta$ is a specified integer that depends upon the size of the bundling window.

6. The method of claim 5 wherein the PUCCH resources offset $N_{ePUCCH}^{(1)}$ is a UE-specific parameter determined by the eNB.

7. The method of claim 2 further comprising, for each ePDCCH detected in a subframe n-$k_i$, calculating the PUCCH resource index $n_{PUCCH,i}^{(1)}$ for transmission in a subframe n by selecting a value p from {0,1} that satisfies:

$$N_p \le n_{eCCE} < N_{p+1}$$

where $N_0=0$, $N_1=2$, and $N_2=4$
and calculating $n_{PUCCH,i}^{(1)}$ as:

$$n_{PUCCH,i}^{(1)} = E/2 \cdot (I_{PRB\_ePDCCH}^{lowest\_index} - N_{PRB,ePDCCH}^{offset}) + n_{eCCE} + F_1 + F_1 + \delta_i + N_{ePUCCH}^{(1)}$$

where n is an integer, K is the set of downlink subframe indexes in the bundling window of subframe n, M is the number of downlink subframes in the bundling window, $k_i \in K$, $0 \le i \le M-1$, $N_{RB,ePDCCH}^i$ indicates the ePDCCH physical resource blocks (PRBs) reserved for use in transmitting the ePDCCH in a downlink subframe, $I_{PRB\_ePDCCH}^{lowest\_index}$ is the lowest PRB index including at least one eCCE of the ePDCCH detected in the subframe n-$k_i$, $N_{PRB,ePDCCH}^{offset}$ indicates the lowest PRB index for ePDCCH transmission, E is the number of eCCEs in one PRB, $n_{eCCE}$ is the lowest index of the eCCE in the ePDCCH detected in subframe n-$k_i$, $0 \le n_{eCCE} < E$, which is mapped to a PUCCH resource index $n_{PUCCH,i}^{(1)}$, $N_{ePUCCH}^{(1)}$ indicates the PUCCH resources offset for the ePDCCH, $\Delta$ is a specified integer that depends upon the bundling window size, and where:

where:

$$F_1 = \sum_{l=0}^{l=M-i-2} N_{RB,ePDCCH}^{M-l-1} \cdot N_p,$$

$$F_2 = \sum_{j=0}^{i} N_{RB,ePDCCH}^{j} \cdot N_{p+l},$$

and $$\delta_i = \left(N_{RB,ePDCCH}^{i} - I_{PRB\_ePDCCH}^{lowest\_index} - 1\right) \cdot E/2 \cdot p.$$

8. The method of claim 7 wherein the PUCCH resources offset $N_{ePUCCH}^{(1)}$ is a UE-specific parameter determined by the eNB.

9. The method of claim 2 further comprising, for each ePDCCH detected in a subframe n-$k_i$, calculating the PUCCH resource index $n_{PUCCH,i}^{(1)}$, for transmission in a subframe n by selecting a value p from {0,1} that satisfies:

$$N_p \le n_{eCCE} < N_{p+1}$$

where $N_0 = 0$, $N_1 = 2$, and $N_2 = 4$
and calculating $n_{PUCCH,i}^{(1)}$ as:
$n_{PUCCH,i}^{(1)} = E \cdot \Delta \cdot (I_{PRB\_ePDCCH}^{lowest\_index} - N_{PRB,ePDCCH}^{offset}) + n_{eCCE} + (M-i-1) \cdot N_p + i \times N_{p+1} + N_{ePUCCH}^{(1)}$
where n is an integer, K is the set of downlink subframe indexes in the bundling window of subframe n, M is the number of downlink subframes in the bundling window, $k_i$ $\in K$, $0 \le i \le M-1$, $N_{RB,ePDCCH}^{i}$ indicates the ePDCCH physical resource blocks (PRBs) reserved for use in transmitting the ePDCCH, in a downlink subframe, $I_{PRB\_ePDCCH}^{lowest\_index}$ is the lowest PRB index including at least one eCCE of the ePDCCH detected in the subframe n-$k_i$, $N_{PRB,ePDCCH}^{offset}$ indicates the lowest PRB index for ePDCCH transmission, E is the number of eCCEs in one PRB, $n_{eCCE}$ is the lowest index of the eCCE in the ePDCCH detected in subframe n-$k_i$, $0 \le n_{eCCE} < E$, which is mapped to a PUCCH resource index $n_{PUCCH,i}^{(1)}$, $N_{ePUCCH}^{(1)}$ indicates the PUCCH resources offset for the ePDCCH, $\Delta$ is a specified integer that depends upon the bundling window size.

10. The method of claim 9 wherein the PUCCH resources offset $N_{ePUCCH}^{(1)}$ is a UE-specific parameter determined by the eNB.

11. The method of claim 2 further comprising, for each ePDCCH detected in a subframe n-$k_i$, calculating the PUCCH resource index $n_{PUCCH,i}^{(1)}$ for transmission in a subframe n as:

$n_{PUCCH,i}^{(1)} = \Delta \cdot (E \cdot (I_{PRB\_ePDCCH}^{lowest\_index} - N_{PRB,ePDCCH}^{offset}) + n_{eCCE}) + i + N_{ePUCCH}^{(1)}$ where n is an integer, K is the set of downlink subframe indexes in the bundling window of subframe n, M is the number of downlink subframes in the bundling window, $k_i$ $\in K$, $0 \le i \le M-1$, $N_{RB,ePDCCH}^{i}$ indicates the ePDCCH physical resource blocks (PRBs) reserved for use in transmitting the ePDCCH in a downlink subframe, $I_{PRB\_ePDCCH}^{lowest\_index}$ is the lowest PRB index including at least one eCCE of the ePDCCH detected in the subframe n-$k_i$, $N_{PRB,ePDCCH}^{offset}$ indicates the lowest PRB index for ePDCCH transmission, E is the number of eCCEs in one PRB, $n_{eCCE}$ is the lowest index of the eCCE in the ePDCCH detected in subframe n-$k_i$, $0 \le n_{eCCE} < E$, which is mapped to a PUCCH resource index $n_{PUCCH,i}^{(1)}$, $N_{ePUCCH}^{(1)}$ indicates the PUCCH resources offset for the ePDCCH, and $\Delta$ is a specified integer that depends upon the bundling window size.

12. The method of claim 11 wherein the PUCCH resources offset $N_{ePUCCH}^{(1)}$ is a UE-specific parameter determined by the eNB.

13. The device of claim 1 wherein the processing circuitry is further to detect the ePDCCH in a downlink subframe belonging to a specified bundling window of M indexed downlink subframes and wherein the PUCCH resource is defined by a PUCCH resource index $n_{PUCCH,i}^{(1)}$ that is a function of subframe index, lowest index of a PRB containing at least one eCCE in the detected ePDCCH, and lowest eCCE index.

14. The device of claim 13 wherein the processing circuitry is further to, for each ePDCCH detected in a subframe n-$k_i$, calculate the PUCCH resource index $n_{PUCCH,i}^{(1)}$ for transmission in a subframe n as:

$$n_{PUCCH,i}^{(1)} = E \cdot \left( \sum_{l=0}^{i-1} N_{RB,ePDCCH}^{l} + \left( I_{PRB\_ePDCCH}^{lowest\_index} - N_{PRB,ePDCCH}^{offset} \right) \right) + n_{eCCE} + N_{ePUCCH}^{(1)}$$

where n is an integer, K is the set of downlink subframe indexes in the bundling window of subframe n, M is the number of downlink subframes in the bundling window, $k_i$ $\in K$, $0 \le i \le M-1$, $N_{RB,ePDCCH}^{i}$ indicates the ePDCCH physical resource blocks (PRBs) reserved for use in transmitting the ePDCCH in a downlink subframe, $I_{PRB\_ePDCCH}^{lowest\_index}$ is the lowest PRB index including at least one eCCE of the ePDCCH detected in the subframe n-$k_1$, $N_{PRB,ePDCCH}^{offset}$ indicates the lowest PRB index for ePDCCH transmission, E is the number of eCCEs in one PRB, $n_{eCCE}$ is the lowest index of the eCCE in the ePDCCH detected in subframe n-$k_i$, $0 \le n_{eCCE} < E$, which is mapped to a PUCCH resource index $n_{PUCCH,i}^{(1)}$, and $N_{ePUCCH}^{(1)}$ indicates the PUCCH resources offset for the ePDCCH.

15. The device of claim 13 wherein the processing circuitry is further to, for each ePDCCH detected in a subframe n-$k_i$, calculate the PUCCH resource index $n_{PUCCH,i}^{(1)}$ for transmission in a subframe n as:

$n_{PUCCH,i}^{(1)} = E \cdot \Delta \cdot (I_{PRB\_ePDCCH}^{lowest\_index} - N_{PRB,ePDCCH}^{offset}) + n_{eCCE} + E \cdot i + N_{ePUCCH}^{(1)}$ where n is an integer, K is the set of downlink subframe indexes in the bundling window of subframe n, M is the number of downlink subframes in the bundling window, $k^i$ $\in K$, $0 \le i \le M-1$, $N_{RB,ePDCCH}^{i}$ indicates the ePDCCH physical resource blocks (PRBs) reserved for use in transmitting the ePDCCH in a downlink subframe, $I_{ePDCCH}^{PRB\ lowest\_index}$ is the lowest PRB index including at least one eCCE of the ePDCCH detected in the subframe n-$k_i$, $N_{PRB,ePDCCH}^{offset}$ indicates the lowest PRB index for ePDCCH transmission, E is the number of eCCEs in one PRB, $n_{eCCE}$ is the lowest index of the eCCE in the ePDCCH detected in subframe n-$k_i$, $0 \le n_{eCCE} < E$, which is mapped to a PUCCH resource index $n_{PUCCH,i}^{(1)}$, $N_{ePUCCH}^{(1)}$ indicates the PUCCH resources offset for the ePDCCH, and $\Delta$ is a specified integer that depends upon the size of the bundling window.

16. The device of claim 13 wherein the processing circuitry is further to, for each ePDCCH detected in a subframe n-$k_i$, calculate the PUCCH resource index $n_{PUCCH,i}^{(1)}$ for transmission in a subframe n by selecting a value p from {0,1} that satisfies:

$$N_p \le n_{eCCE} < N_{p+1}$$

where $N_0=0$, $N_1=2$, and $N_2=4$
and calculate $n_{PUCCH,i}^{(1)}$ as:

$n_{PUCCH,i}^{(1)} = E/2 \cdot (I_{PRB\_ePDCCH}^{lowest\_index} - N_{PRB,ePDCCH}^{offset}) + n_{eCCE} + F_1 + F_1 + \delta_i + N_{ePUCCH}^{(1)}$ where n is an integer, K is the set of downlink subframe indexes in the bundling window of subframe n, M is the number of downlink subframes in the bundling window, $k_i \in K$, $0 \le i \le M-1$, $N_{RB,ePDCCH}^i$ indicates the ePDCCH physical resource blocks (PRBs) reserved for use in transmitting the ePDCCH in a downlink subframe, $I_{PRB\_ePDCCH}^{lowest\_index}$ is the lowest PRB index including at least one eCCE of the ePDCCH detected in the subframe n-$k_i$, $N_{PRB,ePDCCH}^{offset}$ indicates the lowest PRB index for ePDCCH transmission, E is the number of eCCEs in one PRB, $n_{eCCE}$ is the lowest index of the eCCE in the ePDCCH detected in subframe n-$k_i$, $0 \le n_{eCCE} < E$, which is mapped to a PUCCH resource index $n_{PUCCH,i}^{(1)}$, $N_{ePUCCH,i}^{(1)}$ indicates the PUCCH resources offset for the ePDCCH, $\Delta$ is a specified integer that depends upon the bundling window size, and where:

where:

$$F_1 = \sum_{l=0}^{l=M-i-2} N_{RB,ePDCCH}^{M-l-1} \cdot N_p,$$

$$F_2 = \sum_{j=0}^{i} N_{RB,ePDCCH}^j \cdot N_{p+l},$$

and $$\delta_i = (N_{RB,ePDCCH}^i - I_{PRB\_ePDCCH}^{lowest\_index} - 1) \cdot E/2 \cdot p.$$

17. The device of claim 13 wherein the processing circuitry is further to, for each ePDCCH detected in a subframe n-$k_i$, calculate the PUCCH resource index $n_{PUCCH,i}^{(1)}$ for transmission in a subframe n by selecting a value p from {0,1} that satisfies:

$N_p \le n_{eCCE} < N_{p+1}$ where $N_0=0$, $N_1=2$, and $N_2=4$
and calculate $n_{PUCCH,i}^{(1)}$ as:

$n_{PUCCH,i}^{(1)} = E \cdot \Delta \cdot (I_{PRB\_ePDCCH}^{lowest\_index} - N_{PRB,ePDCCH}^{offset}) + n_{eCCE} + (M-i-1) \cdot N_p + i \times N_{p+1} + N_{ePUCCH}^{(1)}$ where n is an integer, K is the set of downlink subframe indexes in the bundling window of subframe n, M is the number of downlink subframes in the bundling window, $k_i \in K$, $0 \le i \le M-1$, $N_{RB,ePDCCH}^i$ indicates the ePDCCH physical resource blocks (PRBs) reserved for use in transmitting the ePDCCH in a downlink subframe, $I_{PRB\_ePDCCH}^{lowest\_index}$ is the lowest PRB index including at least one eCCE of the ePDCCH detected in the subframe n-$k_i$, $N_{PRB,ePDCCH}^{offset}$ indicates the lowest PRB index for ePDCCH transmission, E is the number of eCCEs in one PRB, $n_{eCCE}$ is the lowest index of the eCCE in the ePDCCH detected in subframe n-$k_i$, $0 \le n_{eCCE} < E$, which is mapped to a PUCCH resource index $n_{PUCCH,i}^{(1)}$, $N_{ePUCCH}^{(1)}$ indicates the PUCCH resources offset for the ePDCCH, $\Delta$ is a specified integer that depends upon the bundling window size.

18. The device of claim 13 wherein the processing circuitry is further to, for each ePDCCH detected in a subframe n-$k_i$, calculate the PUCCH resource index $n_{PUCCH,i}^{(1)}$ for transmission in a subframe n as:

$n_{PUCCH,i}^{(1)} = \Delta \cdot (E \cdot (I_{PRB\_ePDCCH}^{lowest\_index} - N_{PRB,ePDCCH}^{offset}) + n_{eCCE})i + N_{ePUCCH}^{(1)}$ where n is an integer, K is the set of downlink subframe indexes in the bundling window of subframe n, M is the number of downlink subframes in the bundling window, $k_i \in K$, $0 \le i \le M-1$, $N_{RB,ePDCCH}^i$ indicates the ePDCCH physical resource blocks (PRBs) reserved for use in transmitting the ePDCCH in a downlink subframe, $I_{PRB\_ePDCCH}^{lowest\_index}$ the lowest PRB index including at least one eCCE of the ePDCCH detected in the subframe n-$k_i$, $N_{PRB,ePDCCH}^{offset}$ indicates the lowest PRB index for ePDCCH transmission, E is the number of eCCEs in one PRB, $n_{eCCE}$ is the lowest index of the eCCE in the ePDCCH detected in subframe n-$k_i$, $0 \le n_{eCCE} < E$, which is mapped to a PUCCH resource index $n_{PUCCH,i}^{(1)}$, $N_{ePUCCH}^{(1)}$ indicates the PUCCH resources offset for the ePDCCH, and $\Delta$ is a specified integer that depends upon the bundling window size.

19. A method for operating an evolved Node B (eNB) in a in an LTE (Long Term Evolution) network using TDD (time division duplex) mode, comprising:
transmitting data to a UE (user equipment) via a downlink physical downlink shared channel (PDSCH) in a subframe;
allocating PDSCH resources to the UE for the subframe in an enhance physical downlink control channel (ePDCCH) made up of one or more enhanced control channel elements (eCCEs) contained within physical resource blocks (PRBs) that are indexed in a cell-specific manner;
allocating a physical uplink control channel (PUCCH) resource to the UE for acknowledging the transmitted data by implicitly indicating the PUCCH resource in the ePDCCH;
wherein the ePDCCH is transmitted in a downlink subframe belonging to a specified bundling window of M indexed downlink subframes and wherein the PUCCH resource is defined by a PUCCH resource index $n_{PUCCH,i}^{(1)}$ and further comprising, for each subframe in the bundling window having an ePDCCH allocating downlink resources, calculating the PUCCH resource index $n_{PUCCH,i}^{(1)}$ such that consecutive PUCCH resource indices are mapped to by the ePDCCHs ordered in accordance with an ordered list of the eCCEs making up the ePDCCHs where the eCCEs are: 1) ordered first according to subframe index, then according to PRB index, and then according to eCCE index, 2) ordered first according to PRB index, then according to subframe index, and then according to eCCE index, 3) ordered first according to slot number within the subframe, then according to subframe index, then according to PRB index, and then according to eCCE index, 4) ordered first according to PRB index, then according to slot number within the subframe, then according to subframe index, and then according to eCCE index, or 5) ordered first according to PRB index, then according to eCCE index, then according to subframe index.

20. The method of claim 19 wherein the PUCCH resource is defined by a PUCCH resource index $n_{PUCCH,i}^{(1)}$ that is a function of subframe index, lowest index of a PRB containing at least one eCCE of the detected ePDCCH, and lowest eCCE index of the detected ePDCCH.

21. The method of claim 20 wherein the PUCCH resource index $n_{PUCCH,i}^{(1)}$ is further a function of a PUCCH resources offset $n_{ePUCCH}^{(1)}$ that is determined by the eNB in a UE-specific manner.

22. A device operating as user equipment (LIE) in an LIE network, comprising:
an RE transceiver for providing an LIE air interface for communicating with a base station operating as an enhanced/evolved Node B (eNB); and processing circuitry to:
receive transmitted downlink resource allocations from an eNB in an enhanced physical downlink control channel (ePDCCH) made up of one or more indexed enhanced control channel elements (eCCEs) contained within indexed physical resource blocks (PRBs);
detect an ePDCCH allocating downlink resources in a subframe belonging to a specified bundling window of M indexed subframes and transmit a hybrid-ARQ acknowledgement corresponding to the detected ePDCCH via a physical uplink control channel (PUCCH) resource defined by a PUCCH resource index $n_{PUCCH,i}^{(1)}$ that is a function of subframe index, PRB index, and eCCE index; and,
for each subframe in the bundling window having an ePDCCH allocating downlink resources, calculate the PUCCH resource index $n_{PUCCH,i}^{(1)}$ such that consecutive PUCCH resource indices are mapped to by the ePDCCHs ordered in accordance with an ordered list of the eCCEs making up the ePDCCHs where the eCCEs are: 1) ordered first according to subframe index, then according to PRB index, and then according to eCCE index, 2) ordered first according to PRB index, then according to subframe index, and then according to eCCE index, 3) ordered first according to slot number within the subframe, then according to subframe index, then according to PRB index, and then according to eCCE index, 4) ordered first according to PRB index, then according to slot number within the subframe, then according to subframe index, and then according to eCCE index, or 5) ordered first according to PRB index, then according to eCCE index, then according to subframe index.

* * * * *